(12) United States Patent
Reinhart et al.

(10) Patent No.: US 6,181,528 B1
(45) Date of Patent: Jan. 30, 2001

(54) MAGNETIC DISK DRIVE WITH LOAD/ UNLOAD STRUCTURE INCLUDING A BASE, A BODY, RAMPS, AND A H/L RATIO OF 2 OR GREATER

(75) Inventors: Robert Carl Reinhart; Steven Alf Hanssen; Kirk Barrows Price, all of San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/300,074

(22) Filed: Apr. 26, 1999

(51) Int. Cl.⁷ ..................................................... G11B 5/76
(52) U.S. Cl. ..................................... 360/254.7; 360/254.9
(58) Field of Search ........................... 360/254.7, 254.8, 360/254.9, 255

(56) References Cited

U.S. PATENT DOCUMENTS

| | | | |
|---|---|---|---|
| 5,148,339 | * 9/1992 | Yoshida et al. | 360/254.7 |
| 5,231,549 | * 7/1993 | Morehouse et al. | 360/254.8 |
| 5,341,260 | 8/1994 | Jabbari | 360/105 |
| 5,394,281 | 2/1995 | Kajitani | 360/105 |
| 5,530,607 | 6/1996 | Spendlove | 360/105 |
| 5,572,387 | 11/1996 | Brook, Jr. et al. | 360/104 |
| 5,574,604 | 11/1996 | Berg et al. | 360/105 |
| 5,644,451 | 7/1997 | Chan et al. | 360/105 |
| 5,692,289 | 12/1997 | Amada et al. | 29/603.03 |
| 5,764,437 | 6/1998 | Meyer et al. | 360/105 |
| 5,831,795 | 11/1998 | Ma et al. | 360/105 |
| 5,864,448 | * 1/1999 | Berberich | 360/255 |
| 5,870,259 | * 2/1999 | Alt et al. | 360/255 |
| 5,995,330 | * 11/1999 | Furay et al. | 360/254.7 |
| 6,057,988 | * 5/2000 | Berberich et al. | 360/254.9 |
| 6,091,577 | * 6/2000 | Ho et al. | 360/254.9 |

FOREIGN PATENT DOCUMENTS

| | | |
|---|---|---|
| 6-5022 | * 1/1994 | (JP) . |
| 6-84313 | * 3/1994 | (JP) . |
| 10-302421 | * 11/1998 | (JP) . |
| 11-110933 | * 4/1999 | (JP) . |

\* cited by examiner

*Primary Examiner*—Jefferson Evans
(74) *Attorney, Agent, or Firm*—Robert B. Martin

(57) ABSTRACT

The present invention is a magnetic disk drive for reading or writing magnetically, comprising: (i) a base plate; (ii) a plurality of magnetic disks; (iii) a hub fixedly attached to the disks for supporting the disks; (iv) a motor operable to rotate the hub; (v) a plurality of magnetic read/write heads, each associated with the surface of a disk; (vi) an actuator for supporting the heads and moving the heads across the disks; (vii) a support shaft attached to the base plate; and (viii) a load/unload structure for displacing the heads from the disk comprising an elongated body, a base portion fixedly attached to the base plate and a plurality of ramps extending outwardly from the body. The body of the structure is mounted through one or more holes in the body onto the support shaft so that the support shaft extends along the length of the body to support the structure.

7 Claims, 4 Drawing Sheets

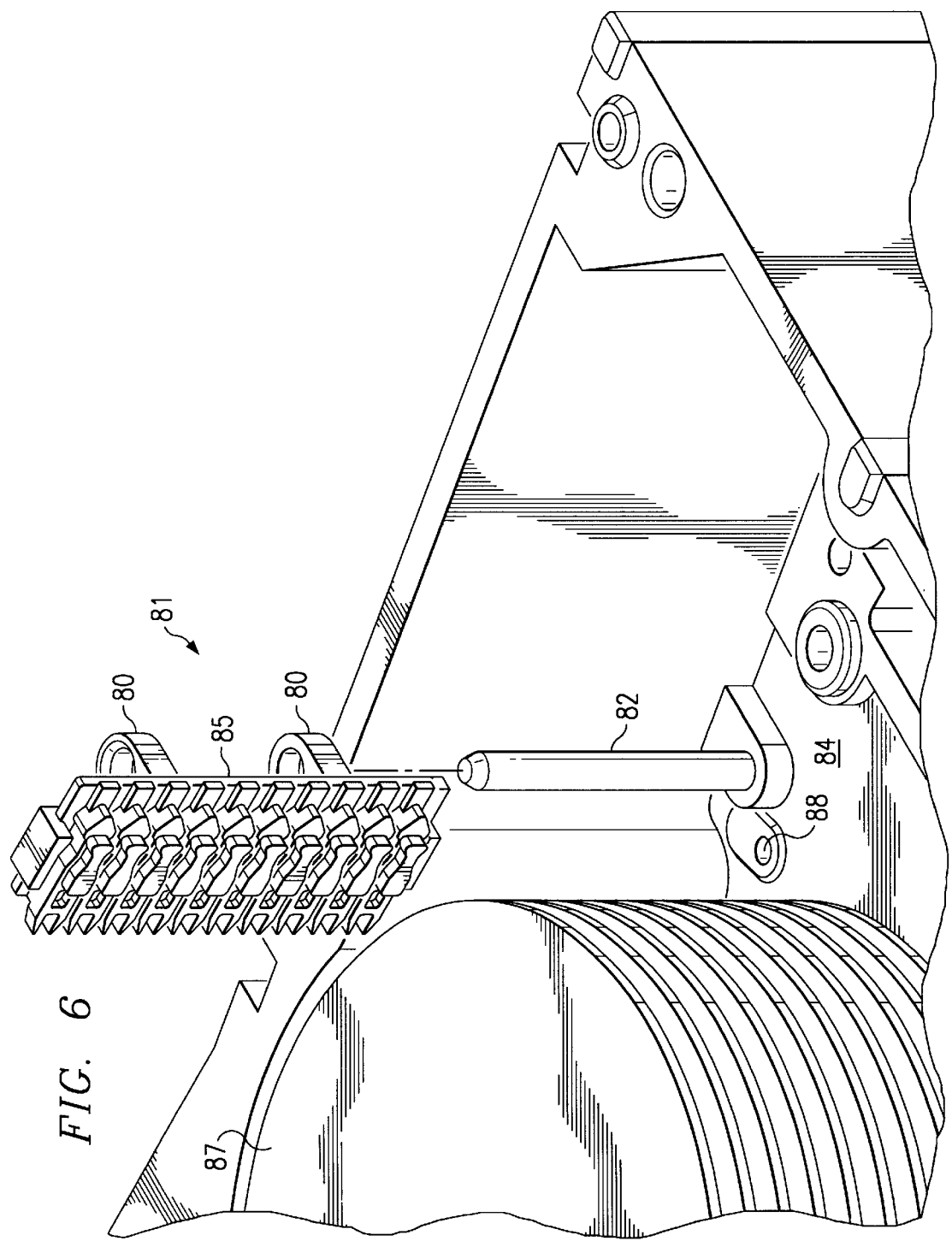

MAGNETIC DISK DRIVE WITH LOAD/ UNLOAD STRUCTURE INCLUDING A BASE, A BODY, RAMPS, AND A H/L RATIO OF 2 OR GREATER

BACKGROUND OF THE INVENTION

1. Field of the Invention

The present invention relates generally to magnetic disk drives with load/unload ramps and, more particularly, to a load/unload ramp structure having a plurality of ramps.

2. Description of the Background Art

A magnetic disk drive storage device typically comprises one or more thin film magnetic disks, each having at least one data recording surface including a plurality of concentric tracks of magnetically stored data, a spindle motor and spindle motor controller for supporting and rotating the disk(s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) of a desired configuration to provide favorable fly height characteristics. In contact start/stop disk drive designs, the slider and transducer are only in contact with the recording surface when the spindle motor is powered down. As the disk begins to rotate, an air flow is generated which enters the slider's leading edge and flows in the direction of its trailing edge. The air flow generates a positive pressure on the ABS, lifting the slider above the recording surface. As the spindle motor reaches operating RPM, the slider is maintained at a nominal fly height over the recording surface by a cushion of air. Then at spin-down, fly height drops until the slider is once again in contact with the disk.

Because contact start/stop recording subjects the slider and transducer to extensive wear, some disk drive designs alternatively employ "load/unload" technology. According to this design, a ramp is provided for each slider/suspension assembly at the inner or outer diameter of the disk where the slider is "parked" securely while the spindle motor is powered down. During normal operation, the disk speed is allowed to reach a selected RPM (which may be below the normal operating RPM) before the head is "loaded" onto the disk from the ramp on the air cushion generated by the disk's rotation. In this manner, the slider flies over the disk without significant contact with the disk surface, eliminating contact start/stop wear. The load/unload ramp structure is generally made of plastic which can be injection molded into complex ramp structures.

By far, the most challenging mechanical aspect of load/unload is obtaining and maintaining the desired vertical clearance between the ramp surfaces and the disks. Packaging considerations demand as tight a clearance as possible for the load/unload structure, given the limited fixed form factor dimension and the many items competing for space in the disk drive, including disks, base plate, actuator, and electronics. Additionally, alignment of the ramp to the actuator suspensions is also extremely critical. Therefore, designing a ramp system which requires little additional clearance for tolerance/variability due to the installation of the ramp is of great importance.

Current load/unload art utilizes the base of the ramp to establish the vertical relationship to the disk pack. The ramp base is secured tightly to the base plate to establish the vertical positioning of the load/unload structure and the vertical clearance between individual ramp surfaces and the disks. While this approach may be suitable for shorter load/unload structures having only a couple of ramps, problems occur with taller load/unload structures having a large number of ramps (e.g., 5–10 ramps). First, due to the space constraints on the base plate of the disk drive, the dimensions of the surface of the ramp base for attachment to the base plate are small compared to the height of the load/unload structure, resulting in a long cantilever structure. When the base of the load/unload structure is screwed into the base plate of the disk drive, minor deformations caused by tightening of the screw or minor imperfections in the surface of the base plate or the base of the load/unload structure can cause the angle of the cantilever structure to be offset from perpendicular to the base plate (i.e., tilted), thereby altering the vertical clearance between the ramp surfaces and the disks. Therefore, there is a need in the art for a load/unload structure which can be accurately positioned so that the structure is perpendicular to the base plate of the disk drive.

It is the object of the present invention to provide a load/unload structure having improved perpendicularity to the base plate of the disk drive. Other objects and advantages will be apparent from the following disclosure.

SUMMARY OF THE INVENTION

The present invention relates to a magnetic disk drive for reading or writing magnetically, comprising: (i) a base plate; (ii) a plurality of magnetic disks; (iii) a hub fixedly attached to the disks for supporting the disks; (iv) a motor operable to rotate the hub; (v) a plurality of magnetic read/write heads, each associated with the surface of a disk; (vi) an actuator for supporting the heads and moving the heads across the disks; (vii) a support shaft attached to the base plate; and (viii) a load/unload structure mounted on the support shaft for displacing the heads from the disk, the load/unload structure comprises an elongated body, a base portion fixedly attached to the base plate and a plurality of ramps extending outwardly from the body. The body of the structure is mounted through one or more holes in the body onto the support shaft so that the support shaft extends preferably along a substantial portion of the length of the body to support the structure. When positioned on the support shaft, the elongated body is substantially perpendicular to the base plate of the disk drive.

A more thorough disclosure of the present invention is presented in the detailed description of the invention, which follows, and the accompanying figures.

BRIEF DESCRIPTION OF THE DRAWINGS

FIG. 6 is a perspective view of the load/unload structure of the present invention being mounted onto a support shaft in a disk drive.

DETAILED DESCRIPTION OF THE PREFERRED EMBODIMENTS

Figure 1:
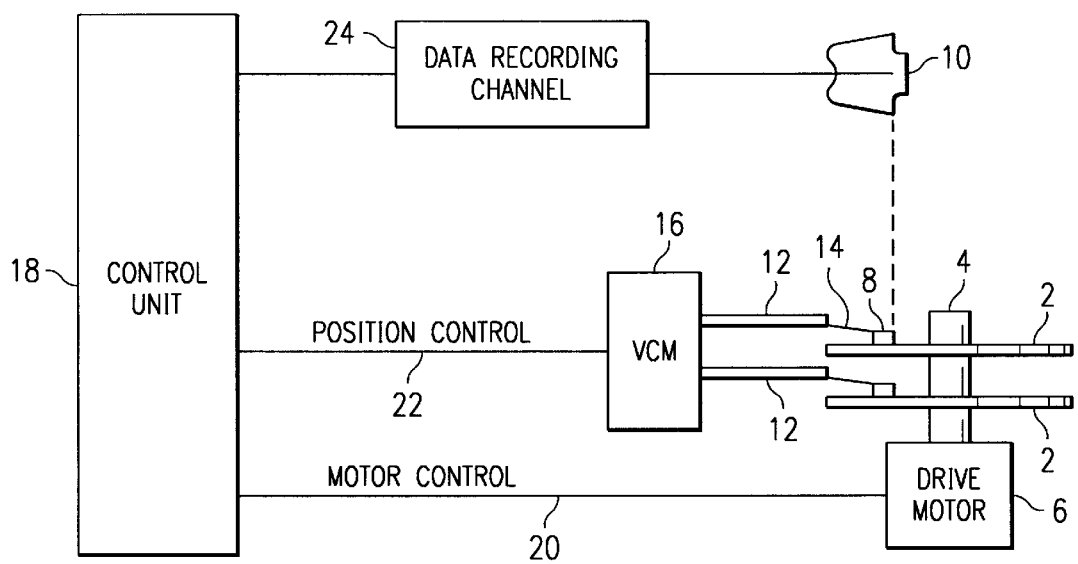
FIG. 1 is a schematic diagram of a magnetic disk storage system useful for the present invention.

Referring to FIG. 1, a magnetic disk storage system comprises at least a plurality of rotatable magnetic disks 2 supported on a spindle 4 and rotated by a disk drive motor 6 with a plurality of sliders 8 positioned adjacent the disks. The sliders each support one or more magnetic read/write transducers 10, commonly referred to in the art as read/write heads.

The magnetic recording media on each disk is in the form of an annular pattern of concentric data tracks (not shown) on disk 2. As the disk rotates, the slider is moved radially or along an arcuate path over the disk surface so that the head 10 may access different portions of the disk where desired data is recorded.

Each slider 8 is attached on its upper surface to an actuator arm 12 by means of a suspension 14. The suspension provides a slight spring force which biases the slider against the disk surface. Each actuator arm 12 is attached to a rotary actuator 16. The rotary actuator as shown in FIG. 1 may be a voice coil motor (VCM), for example.

The various components of the disk storage system are controlled in operation by control signals generated by control unit 18, such as access control signals and internal clock signals. Typically, the control unit 18 comprises logic control circuits, storage means and a microprocessor, for example. The control unit 18 generates control signals to control various system operations such as drive motor control signals on line 20 and head position and seek control signals on line 22. Read and write signals are communicated to and from read/write head by means of recording channel 24.

Figure 2:
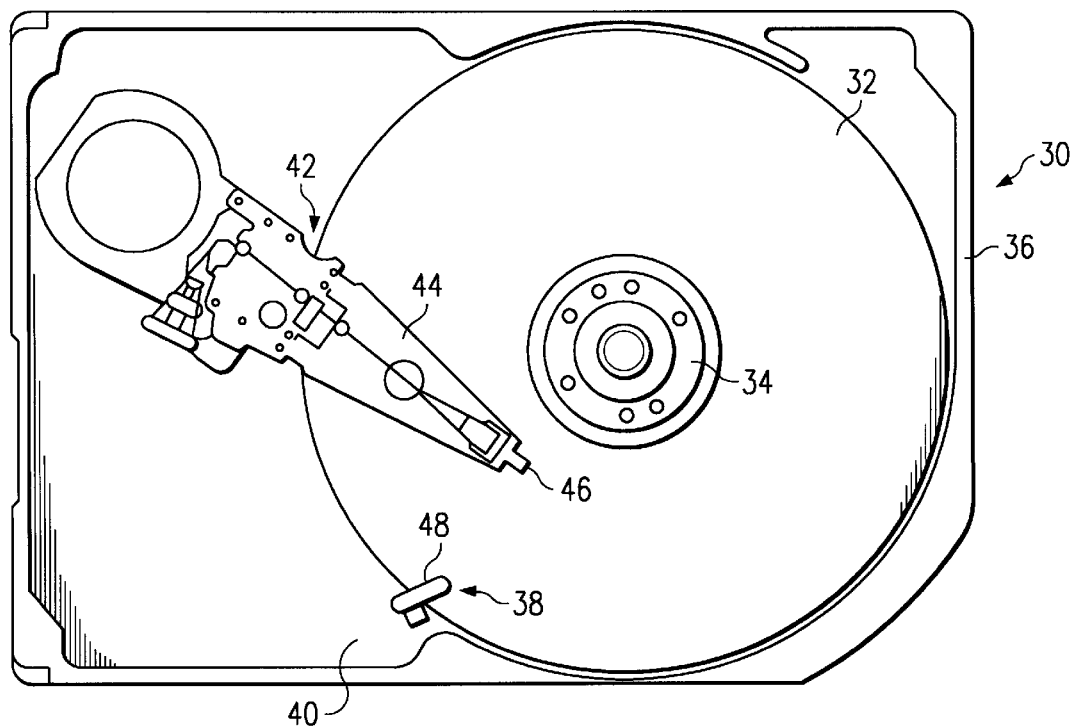
FIG. 2 is a top view of an embodiment of a magnetic storage system of the present invention.

Referring to FIG. 2, there is shown a disk drive 30 having a disk pack 32 comprising a plurality of stacked thin film magnetic recording disks attached to spindle or hub 34 enclosed in housing 36. Load/unload structure 38 is fixedly secured to the base plate 40 of the housing of the disk drive at the outer perimeter of disk pack 32. Rotary actuator assembly 42 comprises a plurality of actuator arms 44 each supporting a slider adjacent to a disk. Each actuator arm suitably has a protrusion or tab 46 at its distal end for engaging a ramp 48 of the load/unload structure 38 during load/unload operations.

Figure 3:
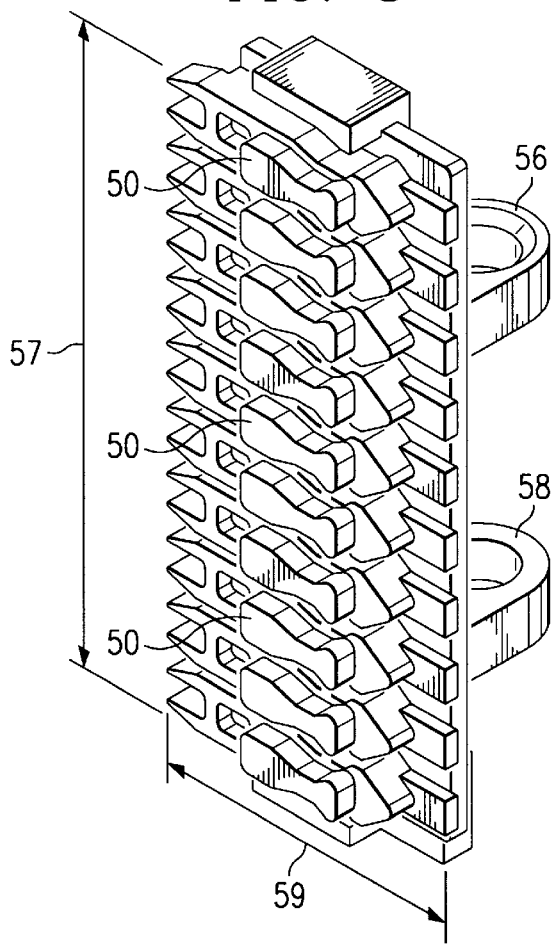
FIG. 3 is a perspective view of the front of an embodiment of a load/unload structure of the present invention.
Figure 4:
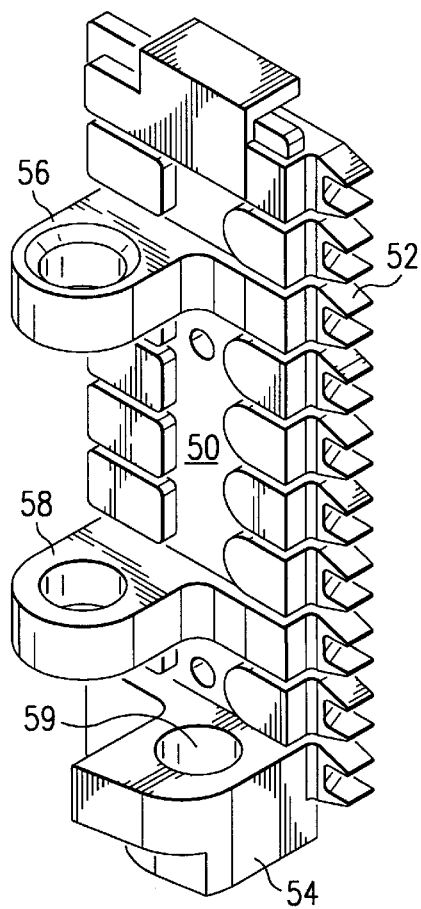
FIG. 4 is a perspective view of the back of an embodiment of a load/unload structure of the present invention.

Referring to FIGS. 3 and 4, in one embodiment, the load/unload structure of the present invention generally comprises an elongated body 50, a plurality of ramps 52 and a base 54. The structure has one or more holes in the body for mounting the structure on a support shaft secured to the base plate of the disk drive. Suitably, the body is integrally formed with lugs 56 and 58 for mounting the body onto a support shaft. The base 54 is provided with at least one hole 59 preferably threaded to enable the base 54 to be fixedly secured to the base plate with a screw. The load/unload structure is generally cantilevered in that it will have a body height/base length aspect ratio of about 2:1 to about 3:1, suitably greater than about 2:1 (i.e., 2.0). The height of the body of the structure is shown as 57 and the length of the base is shown as 59, suitably extending outwardly under the ramps. The load/unload structure is preferably made of polymer material, e.g., liquid crystalline polymer such as copolyesters of 4-hydroxybenzoic acid and 6-hydroxy-2-naphthoic acid (HAHN), polyacetals, or polyetheretherketone (PEEK). The polymer can also have fillers such as polytetrafluorethylene (PTFE).

Figure 5:
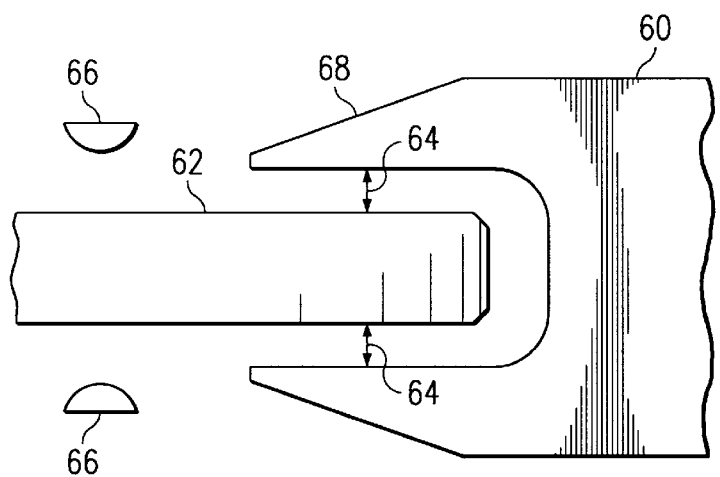
FIG. 5 is a side view of a ramp positioned adjacent a thin film disk.

Referring to FIG. 5, a ramp 60 is positioned adjacent a thin film disk 62. The vertical clearance 64 between the ramp structure and the rotating disk is generally very small (e.g., about 200 microns). To unload the head from the disk, the tab 66 of the actuator is moved onto the inclined surface 68 of ramp 60.

Referring to FIG. 6, the lugs 80 of load/unload structure 81 of the present invention are mounted onto a support shaft 82 which is secured to base plate 84 of the disk drive. The support shaft 82 preferably extends along at least about one-half the height of the body 85 of the load/unload structure to minimize any offset due to clearance tolerance in the holes in lugs 80. The load/unload structure is then rotated into position with the ramps interleaving the disk stack 87 as shown in FIG. 5. The structure is then preferably fixedly secured to the base plate by passing a screw through a hole 88 in the base plate and screwing it into the base of the load/unload structure.

Figure 7:
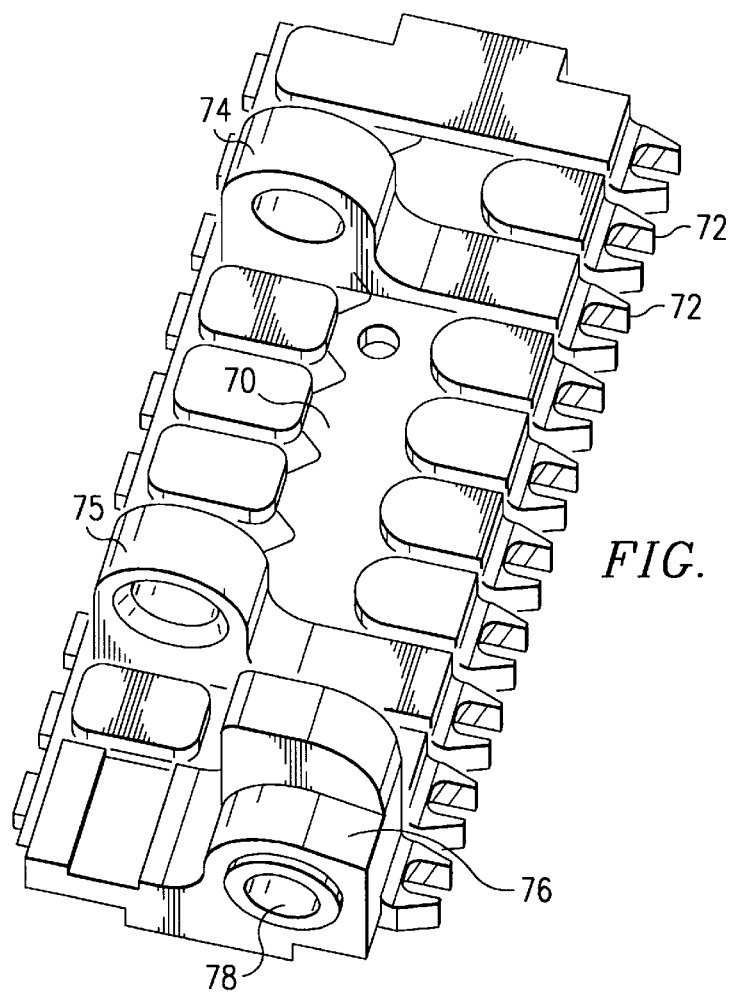
FIG. 7 is a perspective bottom view of the load/unload structure of the present invention.

Referring to FIG. 7, there is shown another embodiment of the load/unload structure of the present invention comprising body 70, ramps 72, lugs 74 and 75 and base 76. Base 76 is provided with a threaded metal insert 78 which is positioned over a hole in the base plate. The metal insert enables the base of the structure to be fixedly secured to the base plate without distorting the ramp. Preferably, the insert is provided with a counter bore for receiving a screw having a shoulder for more precise alignment defining the tertiary assembly datum. Preferably the insert extends out from the bottom surface 79 of the base to provide annular surface contact with the base plate defining the secondary assembly datum.

The load/unload structure of the present invention has improved perpendicularity to the base plate of the disk drive and, accordingly, improved alignment of the individual ramps with the individual thin film disks as well as improved alignment with the actuator suspension tabs. Further, the load/unload structure is less susceptible to damage during the manufacturing process.

Although the present invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

We claim:

1. A magnetic recording device for reading or writing magnetically, comprising:

(i) a base plate;

(ii) a plurality of magnetic disks, each comprising a substrate and a magnetic layer;

(iii) a hub fixedly attached to the disks for supporting the disks;

(iv) a motor attached to the base plate and operable to rotate the hub;

(v) a plurality of magnetic read/write heads, each associated with the surface of a disk;

(vi) an actuator for supporting the heads and moving the heads across the disks;

(vii) a support shaft attached to the base plate; and (viii) a load/unload structure for displacing the heads from the disk comprising (a) an elongated body having a height H, (b) a base portion having a length L and fixedly attached to the base plate, and (c) a plurality of ramps extending outwardly from the body, the structure mounted through one or more holes in the body onto the support shaft so that the support shaft extends along a portion of the height of the elongated body to support the structure in an upright position substantially perpendicular to the base plate, the structure having an H/L aspect ratio of greater than about 2.

2. The device of claim 1 wherein the load/unload structure has greater than five ramps.

3. The device of claim 1 wherein the support shaft extends along at least about one-half of the height of the body.

4. The device of claim 1 wherein the base of the load/unload structure has a hole with a counter bore for receiving a screw with a shoulder to fixedly attach the base to the base plate.

5. The device of claim 4 wherein a cylindrical metal insert for receiving a screw is inserted into the counter bore.

6. The device of claim 5 wherein the insert extends beyond the surface of the base.

7. The device of claim 1 wherein the one or more holes in the body of the load/unload structure are lug shaped and positioned along the height of the elongated body.

* * * * *